United States Patent [19]

Shai

[11] 4,244,027
[45] Jan. 6, 1981

[54] DIGITAL OPEN LOOP PROGRAMMABLE FREQUENCY MULTIPLIER

[75] Inventor: Sol Shai, Edison, N.J.

[73] Assignee: RCA Corporation, New York, N.Y.

[21] Appl. No.: 21,837

[22] Filed: Mar. 19, 1979

[51] Int. Cl.³ .......................... G06F 7/52; H03K 5/00
[52] U.S. Cl. ................................ 364/703; 307/225 R; 328/38
[58] Field of Search .................... 364/703; 307/220 R, 307/225 R; 328/15, 38, 41

[56] References Cited

U.S. PATENT DOCUMENTS

| | | | |
|---|---|---|---|
| 3,970,954 | 7/1976 | Even | 331/53 |
| 3,982,199 | 9/1976 | Green | 331/51 |
| 4,017,719 | 4/1977 | Kaplan et al. | 328/38 X |
| 4,025,866 | 5/1977 | Fletcher et al. | 328/38 |

Primary Examiner—David H. Malzahn
Attorney, Agent, or Firm—Eugene M. Whitacre; Peter M. Emanuel; Eric P. Herrmann

[57] ABSTRACT

A circuit arrangement for multiplying the frequency $f_x$ of an input signal by digital techniques is disclosed. A digital counter driven by a reference oscillator establishes the ratio of the reference frequency to signal frequency. The binary representation of this ratio is applied to a binary divider circuit and divided by the frequency multiplying factor M. The quotient produced is applied to program a presettable binary down-counter operating on the reference frequency $f_o$ to produce an output frequency $Mf_x$ where the components of the reference frequency are caused to cancel out.

4 Claims, 2 Drawing Figures

DIGITAL OPEN LOOP PROGRAMMABLE FREQUENCY MULTIPLIER

This invention relates to frequency multiplier circuits, in particular circuits employing digital logic elements susceptible to programming the multiplication factor.

A frequency multiplier is a circuit having as its input signals a multiplier value M and a frequency, $f_x$, to be multiplied; it responds to these signals to produce output signals at a rate M times $f_x$. Prior art digital frequency multipliers employ a reference oscillator to drive a first counter that measures and stores the length of an input signal period. A second reference oscillator driving a second counter counts an output pulse period. This output counter is reset and an output pulse generated when the output count is equal to the stored count in the first counter. The multiplication factor is the ratio of the frequencies of the two reference oscillators.

The advantage of this system is the ability to multiply by any positive real number whether or not of integer value. It is an open loop system capable of rigidly tracking input signal frequency changes. The disadvantages include the necessity of maintaining a highly stable relationship between the frequencies of two oscillators.

R. K. Even improved upon this scheme with his "Digital Frequency Multiplier", U.S. Pat. No. 3,970,954 issued July 20, 1976. In his arrangement, Even incorporated the first and second reference oscillators into a single reference oscillator thereby eliminating the oscillator stability problem. This system employs a first counter to measure the length of an input signal period. Binary coefficients related to the desired $f_{out}/f_{in}$ ratio are stored in memory and addressed by the count measured in the first counter. A second counter driven by the reference oscillator counts an output pulse period. This counter is reset and an output pulse is generated when the output count is equal to the binary coefficient accessed by the count in the first counter.

A disadvantage of this circuit is that the resolution of the multiplying factor is limited by the size of the memory in that a different coefficient is required for every possible count in the first counter. Further, the circuit has the shortcoming that the first counter may be in error by ±one count.

In accordance with the illustrative embodiment of the present invention, the major disadvantage of the Even multiplier is overcome, while retaining the advantages of utilizing a single reference oscillator to effect the frequency multiplication. A first circuit establishes a first binary number, N, related to a multiple, C, of the ratio of a reference frequency, $f_o$, to the signal frequency, $f_x$, i.e., $N = f_o C/f_x$. A first digital binary divider divides the binary number, N, by the desired multiplication factor, M, applied in binary format. The output quotient available from the first binary divider is a further binary number $N/M = (f_o/f_x)(C/M)$. A second binary divider is interposed to divide this quotient by the multiple C yielding the number $f_o/(f_x M)$ in binary format. This latter binary number is preset into a programmable down-counter arranged to divide or count down the reference frequency and produce an output pulse once for every consecutive number of reference frequency oscillations equal to the preset number or $f_{out} = f_o/(f_x M) = f_x M$.

The invention is illustrated in the accompanying drawings of which

Figure 1:
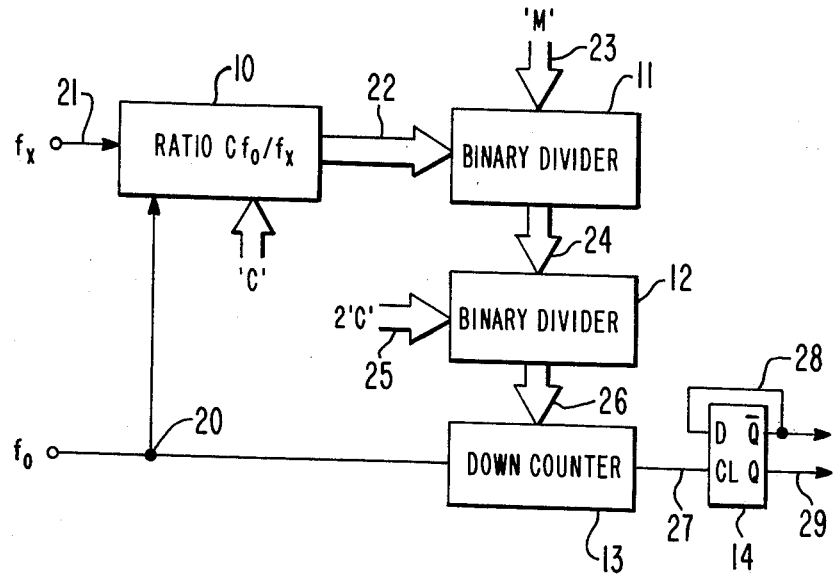
FIG. 1 is a block diagram of an embodiment of the invention.

The FIG. 1 comprises a circuit for multiplying the frequency of a time varying signal $f_x$ by a number M. The number M is applied in binary format for ease of controlling the multiplicative factor. To effect the frequency multiplication, a reference frequency $f_o$ is operated on by a real time binary logic system controlled by the multiplicative factor M and the signal frequency $f_x$ to produce the desired output signal. The reference frequency $f_o$ is chosen to be many times the sought-for $Mf_x$ frequency.

The signal frequency $f_x$ and reference frequency $f_o$ are applied to a digital circuit 10 for determining their ratio, $f_o/f_x$. One method for determining the ratio is simply to count the number of oscillations of reference frequency $f_o$ occurring during the period of one oscillation of signal frequency $f_x$. Because frequencies $f_o$ and $f_x$ in general are asynchronous the error in the count is typically ±1. An error of ±1 represents a large percentage error for a small $f_o/f_x$ ratio. This error is minimized in the circuit 10 by counting the number of oscillations of frequency $f_o$ occurring in C periods of oscillation of signal frequency $f_x$. The absolute error remains at ±1 but the percentage error is reduced by 1/C.

Output signal from ratio determining circuit 10 is a binary representation of the number $Cf_o/f_x$ and may be in simple binary or coded binary format. This number is updated or refreshed every $C/f_x$ seconds and is made available from data bus 22. The signal may be an n-bit serial output on a single signal line or n-parallel one bit signals on n signal lines, n being an arbitrary integer. The signal format is chosen with regard to the nature of the further circuitry.

A trade-off must be made between circuit response time and system accuracy. The greater the number C, of input signal periods which define the period for which the frequency $f_o$ is counted, the greater the system accuracy and also the longer the time between updating of the number representing the ratio $(f_o/f_x)$ C. Both the time constant $\tau = C/f_x$ which establishes the time lag of the circuit 10, and the system accuracy are directly proportional to the value of C.

The binary number $N = (f_o/f_x)$ C available from circuit 10 on data bus 22 is applied as the dividend to a binary divider 11. A second binary number M is applied as a divisor to divider 11 via input connections 23. Binary divider 11 is a circuit of the type which accepts two binary numbers or coded binary numbers and divides one by the other to produce a binary or coded binary quotient at its output connection 24. The quotient in the present case is $(f_o/f_x)(C/M)$. Binary number M may be provided by selective switch means, for static programming, or it may be provided from a dynamic binary system as the digital output of a transducer, for example.

Figure 2:
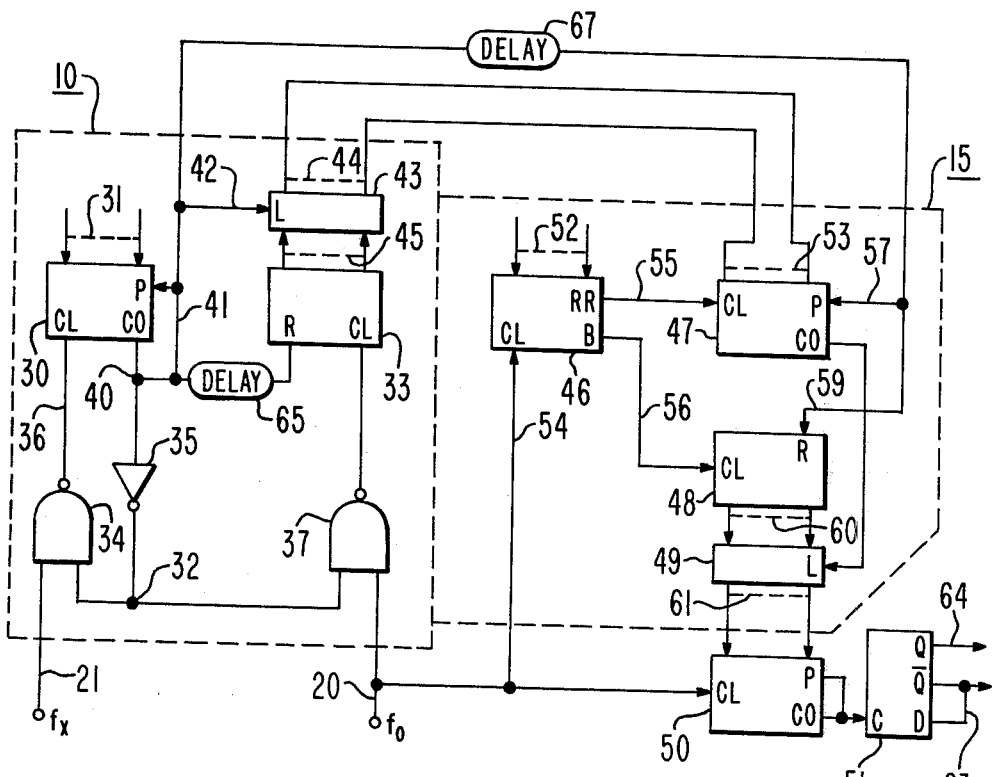
FIG. 2 is a detailed block diagram of a particular embodiment.

Various means may be employed to effect the binary division, the choice of such means dictated in part by the input signal frequencies and the allowable system lag. Binary divider 11 may be implemented with a microprocessor for $f_x$ having relatively low frequencies. On the other hand, for moderate frequencies of up to several megahertz, divider 11 may be implemented with a combination of a rate multiplier, an up-counter and a down-counter as illustrated in FIG. 2, the operation of which to be described within. For still higher frequency operation, dedicated high-speed LSI and hybrid dividers which perform parallel divisions may be used.

A second binary divider 12 is arranged to divide the quotient available from divider 11 by the number C to reduce the binary quotient to $(f_o/f_x)(1/M)$. The second divider 12 may be subsumed in binary divider 11 by incorporating its divisor C in a modified divisor M' for divider 11 such that M'=MC.

The binary number available as output signal at terminals 26 from divider 12 is applied to program a presettable binary down-counter 13. Reference frequency $f_o$ is applied to counter 13 as the input frequency to be divided. Down-counter 13 generates one output pulse at output connection 27, for every sequence of reference frequency oscillations equal in number to the number preset in the counter. The output pulse rate is therefore $f_o$ divided by the factor $((f_o/f_x)(1/M))$ yielding an output pulse rate of $Mf_x$. Counter 13 is preset with the binary number available at 26 for each output pulse at 27, thereby continuously updating the count-down coefficient in 13. Counter 13 presets a new program value at a rate of $Mf_x$, which has the effect of adding the period of $1/(Mf_x)$ to the system time lag.

Typical down-counters of the type implementing counter 50 provide an output signal having a relatively low duty cycle, i.e., the output pulse width is narrow compared to the space between pulses. D-type flip flop 14 is arranged to convert the output signal at connection 27 to a square wave signal available as complementary signals at terminals 28 and 29. The feedback connection from complementary output $\overline{Q}$ to the data input, D, causes flip flop 14 to change state for every positive transition at its clock input terminal CL. In so doing, for regularly spaced pulses at its CL input flip flop 14 generates an output signal at 29 having equal logic-high and logic-low periods. In addition, however, it divides its clock signal by 2 rendering the output at 29 equal to $\frac{1}{2} f_x M$. The factor of one-half may be eliminated by including the factor 2 in the dividend of either the first, 11, or second, 12, binary divider.

The FIG. 2 frequency multiplier circuit includes a ratio-determining circuit circumscribed by the dashed block denoted 10 which includes a presettable binary down-counter 30, a binary up-counter 33, gates 34 and 37, LATCH 43, INVERTER 35 and delay element 65.

Binary up-counter 33, responsive to pulses applied to its clock input terminal CL, exhibits at parallel output terminals 45 a binary representation of the number of pulses applied to input CL. The binary number available at 45 is determined by the number of pulses applied to CL occurring after the most recent pulse applied to its RESET input terminal R. A complete counting period of counter 33 is determined by the period between successive reset pulses. These reset pulses are the output pulses from down-counter 30, and are available at its count-out or CO terminal 40. Downcounter 30 normally exhibits a "low" logic level signal at its CO output terminal, which output undergoes a transition to a "high" logic level signal responsive to a prescribed number of input pulses applied to its input terminal CI via connection 36. The number of input pulses corresponding to the aforementioned factor C required to cause the high level transition is preset in the counter by a binary input signal applied to parallel input terminals 31. The preset signal is loaded into device 30 by application of a pulse to its terminal P which pulse also resets the count output low. It is seen that down-counter 30 controls the count period of upcounter 33 while the binary input signal applied to terminals 31 controls the count period of counter 30. The typical binary input at terminals 31 is 8 bits wide for available devices such as the RCA CD 40103, for example, but can be expanded to 16 or more bits by cascading similar down-counter devices.

Signal frequency $f_x$ and reference frequency $f_o$ are respectively gated to counters 30 and 33 by NAND circuits 34 and 37 to ensure that both counters are active for the same time period, thereby effecting a synchronization of the circuit. NAND circuits 34 and 37 pass frequencies $f_x$ and $f_o$ for the condition that a logic-high signal is present on interconnection 32. The signal level at connection 32 is the complement of the CO output signal of counter 33 by virtue of INVERTER 35. Therefore, the logic level at 32 is normally high and goes low, inhibiting further passage of signal by NAND circuits 34 and 37 when counter 30 has attained the preset count. Counting is resumed after PRESET of counter 30 has been effected.

LATCH 43 receives parallel binary signals at output terminals 45 and stores those signals responsive to a positive going transition at its control terminal L. The binary signals are exhibited at parallel output terminals 44 until information in the LATCH 42 is updated by a subsequent positive-going transition at L. Delay element 65 is interposed in the rest connection to counter 33 to insure that LATCH 42 has sufficient time to accept data from terminals 45 before counter 33 is reset.

The FIG. 2 circuit employs a single binary divider circumscribed by dashed block 15. This binary divider includes a rate-multiplier 46, a down-counter 47, an up-counter 48 and a LATCH 49. The rate-multiplier 46 provides two output frequencies, a base rate at terminal B, and a second rate, higher than the base rate, at terminal RR. The ratio of the rates available, RR/B, is programmed into the rate-multiplier by application of a binary coefficient to parallel input terminals 52, which binary coefficient is the divisor, M, of the composite binary divider 15. Thus, for a base frequency of B pulses per second, the rate available at terminal RR is M times B pulses per second. The maximum pulse rate at RR is equal to its clock input rate $f_o$ applied via connection 54.

The base rate B is applied via connection 56 to the clock input terminal CL of up-counter 48. The second rate, M times B, is applied via connection 55 to the clock input terminal CL of binary down-counter 47. M pulses are applied to counter 47 for every one pulse applied to counter 48.

The binary representation of the ratio of reference to signal frequencies, $f_oC/f_x$, available from circuit 10 at parallel output terminals 44 is applied to the preset terminals 53 of down-counter 47 to program the counter. Counter 47 responsive to signal at its clock input will exhibit an output pulse at its count-output CO terminal for a number of input pulses at CL equal to the binary number preset at terminals 53. The CO signal transition then causes LATCH 49 to receive and hold the binary count present at parallel output terminal 60 of up-counter 48. This count is 1/M times the count of the binary value preset in counter 47. The binary value at parallel output terminals 61 of LATCH 49 after the positive transition of the output signal from CO on connection 58 is therefore $(f_oC/f_x)(1/M')$, where M'=2M C.

The binary output signal available at the parallel output terminals 61 from binary divider 15 is applied to preset binary down-counter 50. Down-counter 50 divides its clock input frequency $f_o$ by this preset value, providing an output rate at connection 62 which is equal to:

$$f_o/(f_oC/f_x2M\ C)=2f_xM$$

Down-counter 50 is connected to preset the binary signal at terminals 61 each time an output pulse occurs at the CO terminal.

Flip flop 51 is provided to generate an output signal at terminal 64 having 50 percent duty cycle. This circuit, however, divides the output at connection 62 by a factor of 2 reducing the output rate to $f_xM$ at terminal 64.

The FIG. 2 embodiment is provided as representative of the invention. One skilled in the art of logic design and armed with foregoing disclosure will be able readily to generate other embodiments of the invention, and the following claims should be liberally construed in recognition of this.

What I claim is:

1. A frequency multiplier comprising:
   means for supplying an input signal having an input frequency;
   means for supplying a reference signal having a reference frequency;
   means for supplying a first group of binary signals representing a multiplication factor by which said input frequency is to be multiplied;
   means responsive to said input and reference signals for generating a second group of binary signals representing the number of cycles of said reference signal in a predetermined number cycles of said input signal;
   means responsive to said first and second groups of binary signals for dividing said number of cycles of said reference signal in said predetermined number of cycles of said input signal by a divisor proportional to said multiplication factor to produce a third group of binary signals representing the quotient of said division; and
   means responsive to said reference signal and said third group of binary signals for dividing said reference frequency of said quotient to produce an output signal having a frequency substantially equal to the product of said input frequency times said multiplication factor.

2. A frequency multiplier as set forth in claim 1 wherein said last means includes a divide-by-two means for causing said output signal to be a square-wave signal.

3. A frequency multiplier as set forth in claim 2 wherein said next to last means further includes a first digital binary divider responsive to said first and second groups of binary signals for dividing said number of cycles of said reference frequency signal in said predetermined number of cycles of said input signal by said multiplication factor to produce an intermediate quotient represented by a fourth group of binary signals; and a second binary divider responsive to said fourth group of binary signals and a fifth group of binary signals representing a constant times said predetermined number of cycles of said input signal for dividing said intermediate quotient represented by said fourth group of binary signals by said constant times said predetermined number of cycles of said input signal to produce said quotient represented by said third group of binary signals.

4. A digital, programmable frequency multiplier for multiplying the frequency of an input signal to produce an output signal having a multiplied frequency, comprising:
   means for supplying a reference signal having a reference frequency substantially higher than said multiplied frequency;
   means responsive to said input signal and to said reference signal for generating a first group of binary signals representing a number proportional to the ratio of said reference frequency to said input frequency;
   means responsive to said first group of binary signals for dividing said number represented thereby by a determinable factor to generate a second group of binary signals representing the quotient of the division; and
   a presettable frequency down-counter divider responsive to said second group of binary signals and said reference signal;
   said presettable frequency down-counter being preset to a preset number in response to said second group of binary signals;
   said presettable frequency down-counter generating said output signal by providing on output pulse for each successive number of cycles of said reference signal substantially equal to said preset number.

* * * * *

UNITED STATES PATENT AND TRADEMARK OFFICE
CERTIFICATE OF CORRECTION

PATENT NO. : 4,244,027
DATED : January 6, 1981
INVENTOR(S) : Sol Shai

It is certified that error appears in the above—identified patent and that said Letters Patent is hereby corrected as shown below:

Column 1, line 23, change "rigidly" to --rapidly--.

Column 1, line 66, change "$f_{out}=f_o/(f_xM)=f_xM$" to --$f_{out}=f_o/(f_o/(f_xM)=f_xM$--.

Column 3, line 60, change "CI" to --CL--.

Column 4, line 21, change "43" to --42--.

Column 4, line 27, change "rest" to --reset--.

Column 5, line 43, change "of" to --by--.

Column 6, line 45, change "on" to --one--.

Signed and Sealed this

Twenty-eighth Day of April 1981

[SEAL]

Attest:

RENE D. TEGTMEYER

Attesting Officer     Acting Commissioner of Patents and Trademarks